Figure 1:
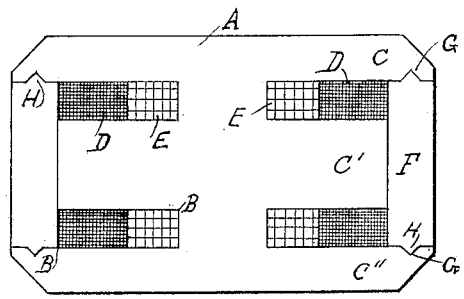

(No Model.)

L. GUTMANN.
ELECTRIC TRANSFORMER.

No. 602,218.  Patented Apr. 12, 1898.

Witnesses:
G. T. Herrington.
G. G. Luthy.

Inventor:
Ludwig Gutmann.

UNITED STATES PATENT OFFICE.

LUDWIG GUTMANN, OF PITTSBURG, PENNSYLVANIA.

ELECTRIC TRANSFORMER.

SPECIFICATION forming part of Letters Patent No. 602,218, dated April 12, 1898.

Application filed October 31, 1890. Serial No. 369,920. (No model.)

*To all whom it may concern:*

Be it known that I, LUDWIG GUTMANN, a subject of the German Emperor, and a resident of Pittsburg, county of Allegheny, and State of Pennsylvania, have invented certain new and useful Improvements in Electric Transformers, (Case No. 50,) of which the following is a specification.

The invention pertains to the improvement of converters of a simple type as well as of battery-converters.

The object is to produce a commercial article in which the waste of material is small and which shall be comparatively inexpensive to build and manufacture.

The invention may be understood by referring to the drawings, in which—

Figure 2:
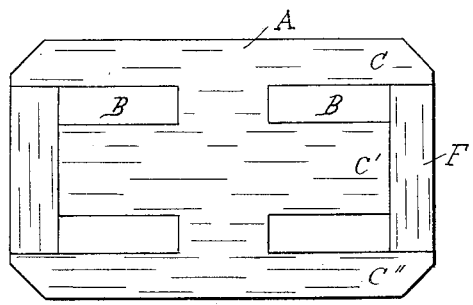

Figure 1 shows a section of a battery-converter; Fig. 2, the core element, and Fig. 3 a view in elevation of the same.

Referring in particular to Fig. 1, the plate A is provided at two sides with recesses or slots B, causing the projections C C' C''. In the recesses or slots B may be located the transformer-windings D and E, one of which may serve as a primary and the other as a secondary. For mechanical and magnetic purposes the piece F is added. It is adapted to hold the coils in position and may be nonmagnetic, but preferably of magnetic material. It may be rigidly attached to the core A in a variety of ways, one of which is illustrated. The projections or poles C C'', which extend over the coil-space, may be provided with recesses G, into which the piece F may be held by suitable projections H. The piece F may be assembled independently from the other core part, if desired, and constitute a separable block, or it may be inserted in any other convenient way—for instance, each plate F may be inserted at the same time with each lamina A as the core is built up in the course of construction—without departing from the nature of the invention. If it consists of magnetic material, it is evident that it would have to be laminated like the core part A. In this form it is shown in Fig. 2.

Figure 3:
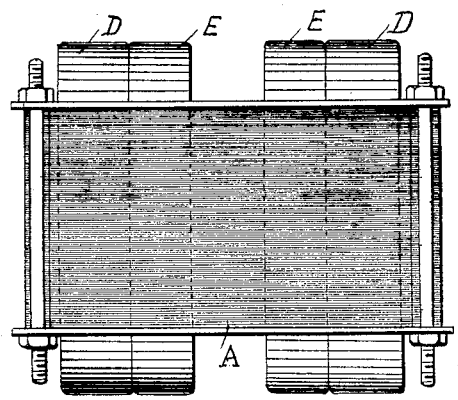

Fig. 3 shows a view in elevation of this transformer. It will be observed that there are two sets of primary coils and two sets of secondary coils, which may be grouped in any convenient way either in series or in parallel. In fact, the device may be considered a double transformer, and it is evident that this transformer type is open to wide modifications, inasmuch as the core A may be given any desired dimensions, and the number of pairs of recesses or slots B may be reduced to one or increased to any desired larger number, for it is evident that instead of producing a battery-transformer of two sets of primary and secondary windings four or six may be provided without departing from the nature of the invention.

Having now described my invention, what I desire to secure by Letters Patent is—

1. A core element for electric transformers consisting of a plate of magnetic material, two recesses or more provided in said plate for locating the transformer-windings, polar projections caused by said recesses, and a second plate or strip of magnetic material interlocking with the polar projections of the plate named first.

2. A core element for electric transformers or similar translating devices consisting of a plate of magnetic material, two or more recesses in said plate causing extensions, and a strip or plate adapted to interlock with said extensions, as and for the purpose described.

3. A core element for electric transformers consisting of a plate or lamina of magnetic material, two or more recesses in said plate, a second plate adapted to bridge said recesses and means for interlocking the said plates, as and for the purpose described.

4. In an electric converter the combination with the windings of a laminated core provided with two or more recesses, adapted to admit the windings of said converter and causing extensions or projections, a second set of recesses and projections located in or on the first-named projections, and one or more blocks or wedges located in the second set of recesses and projections, for the purpose described.

5. In an electromagnetic device the combination with energizing-windings of a core, recesses in said core for retaining said winding or windings, projections caused by said recesses forming polar extensions, a second set of recesses located in said polar extensions and blocks or wedges of any suitable magnetic material, located and retained in the recesses last named for establishing a magnetic path from one pole to the other.

6. In an electromagnetic device the combination of a core, recesses provided in said core forming extensions on either side of each recess, energizing windings or conductors located in said recesses, and partially or completely embedded in said core, a second set of recesses located in the core extensions or poles, and wedges of magnetic material located nearer to the surface or periphery than the winding and retained in the recesses last named, magnetically short-circuiting the poles formed by said extensions, or considerably reducing the magnetic resistance.

In testimony that I claim the foregoing as my invention I have signed my name, in presence of two witnesses, this 21st day of October, 1890.

LUDWIG GUTMANN.

Witnesses:
JAS. J. MCAFEE,
C. S. CRAWFORD.